Oct. 4, 1932.   A. E. PANIER   1,881,289
AUTOMATIC LIQUID MEASURING AND DELIVERING APPARATUS
Filed Oct. 21, 1929   6 Sheets-Sheet 2
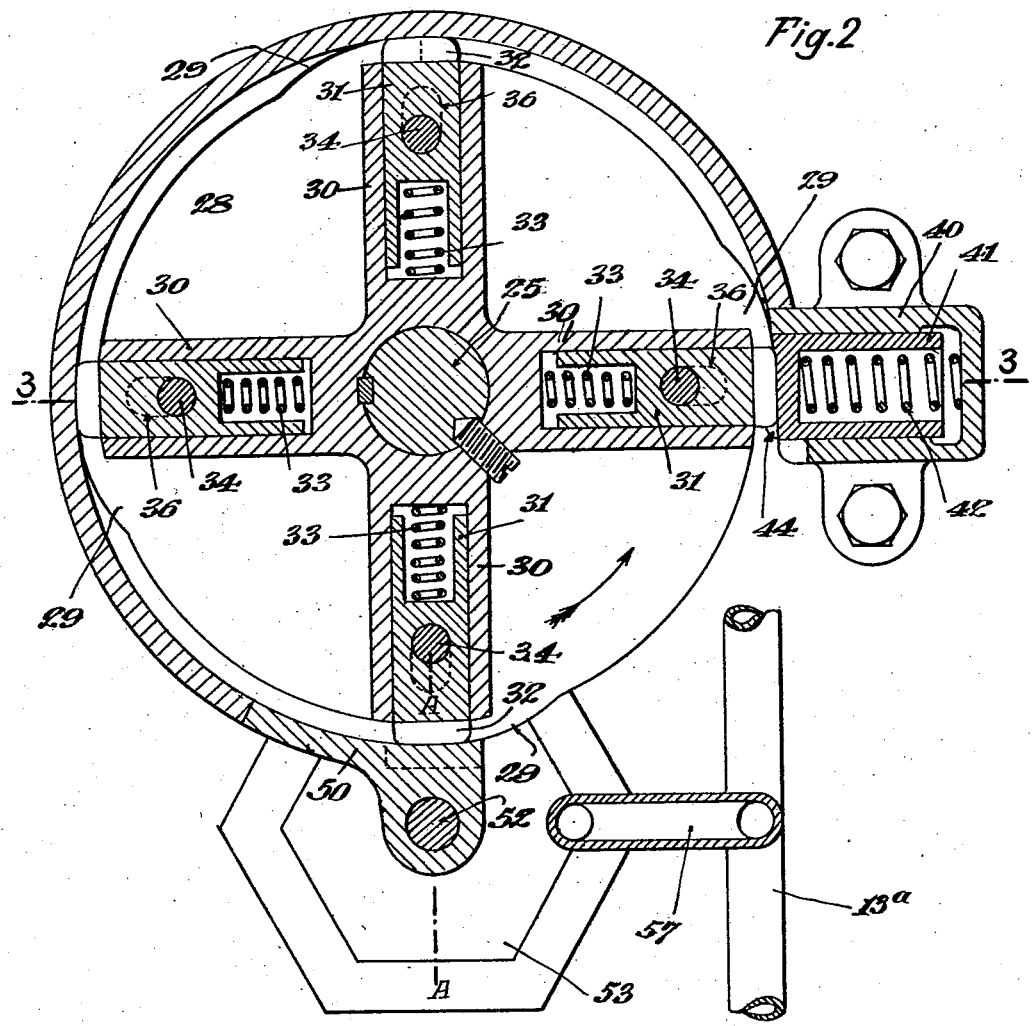
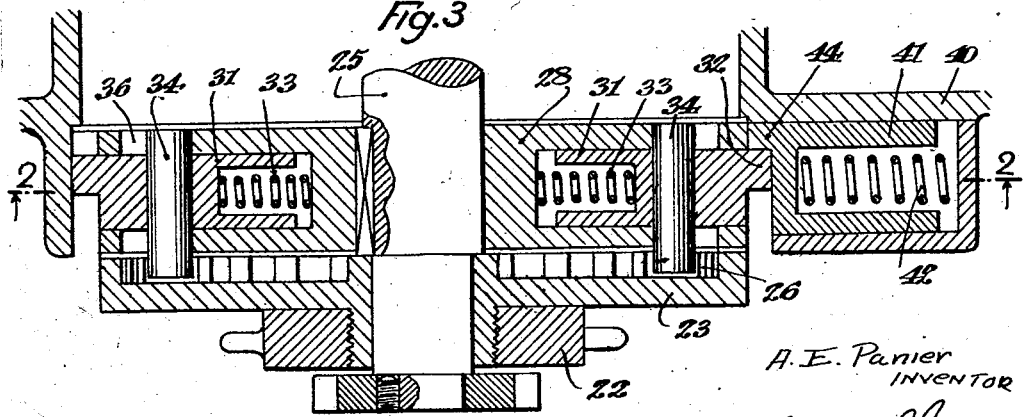

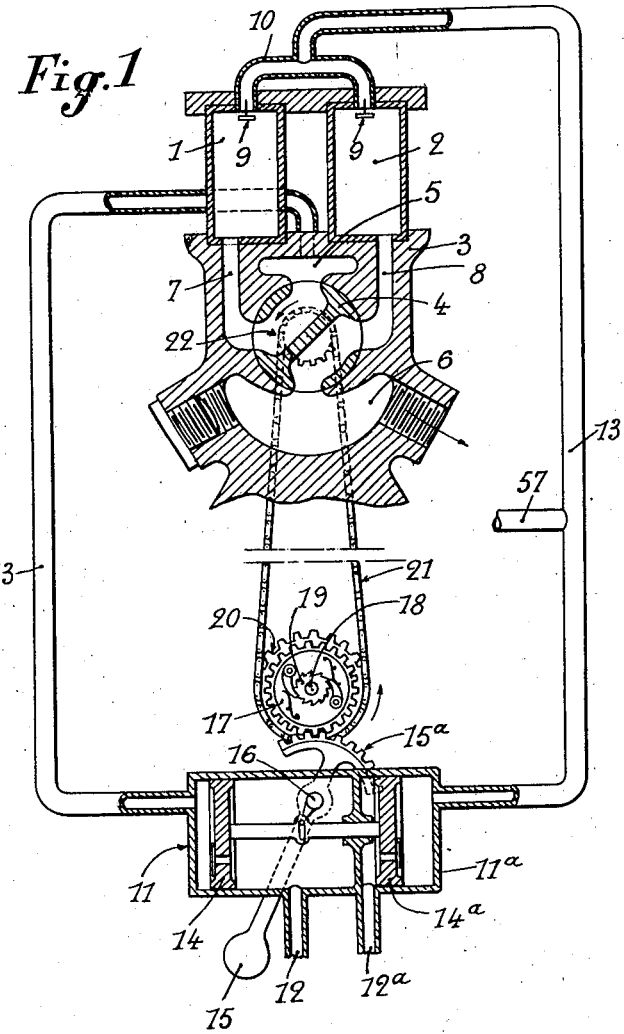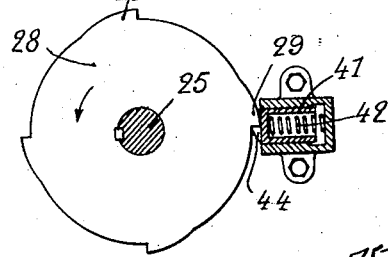

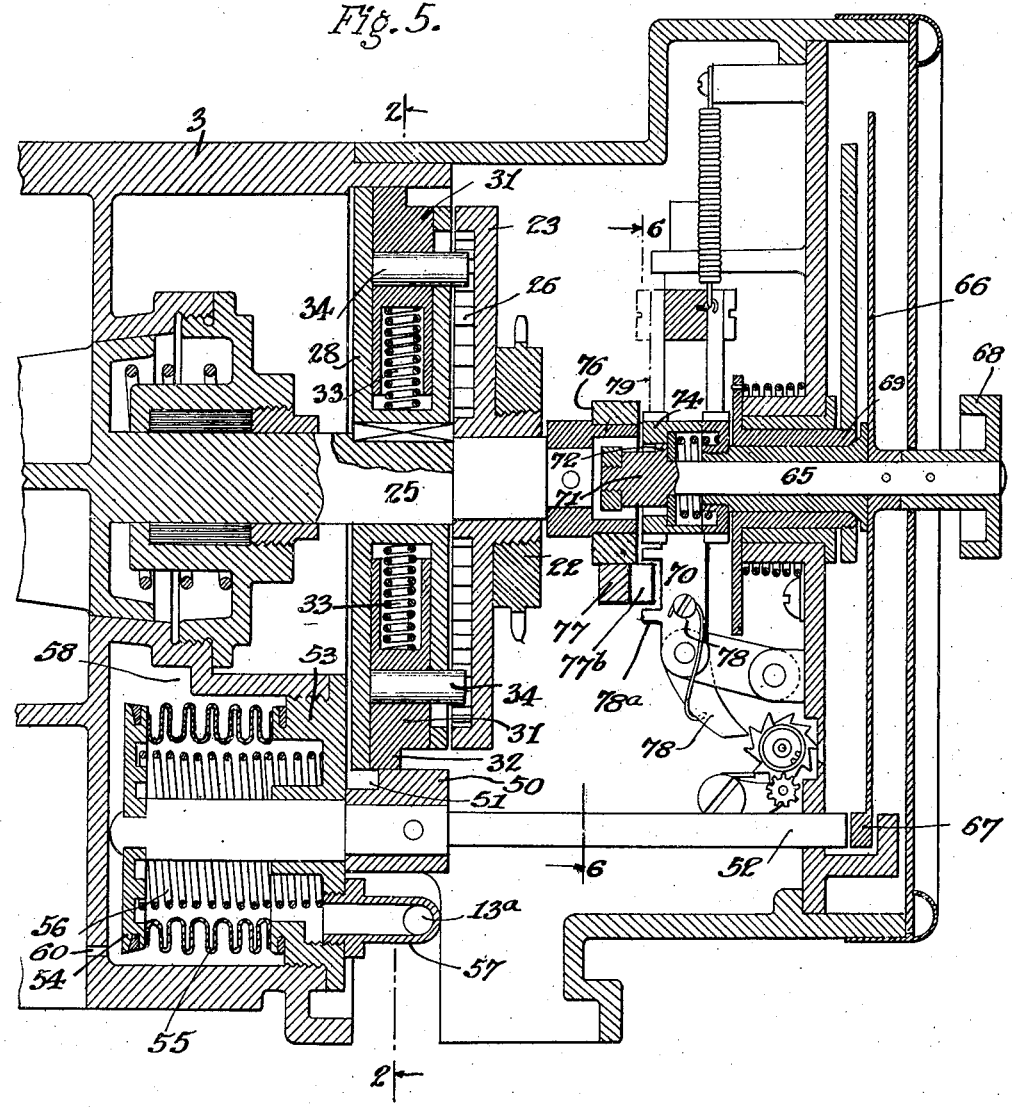

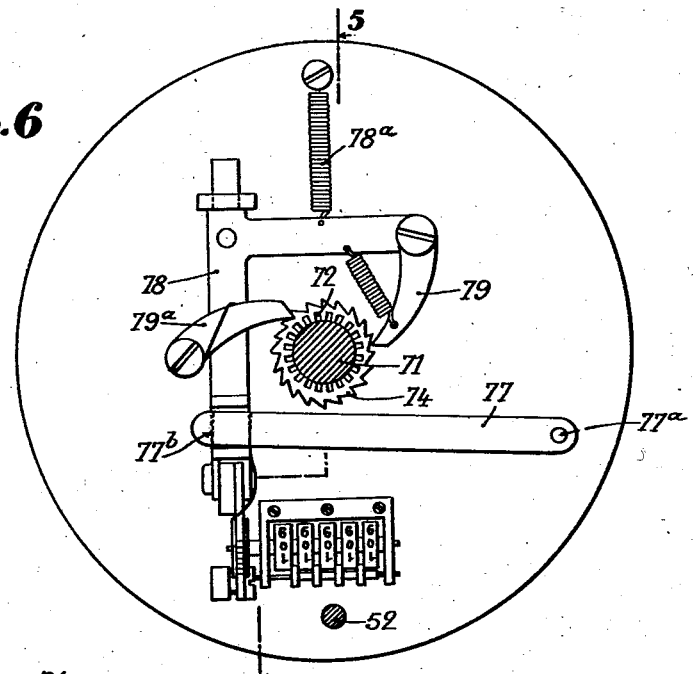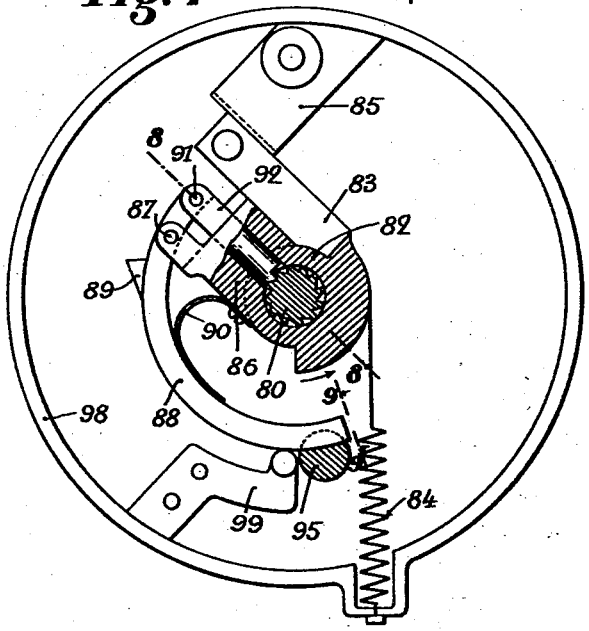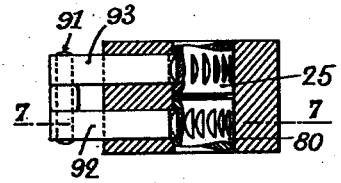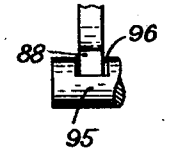

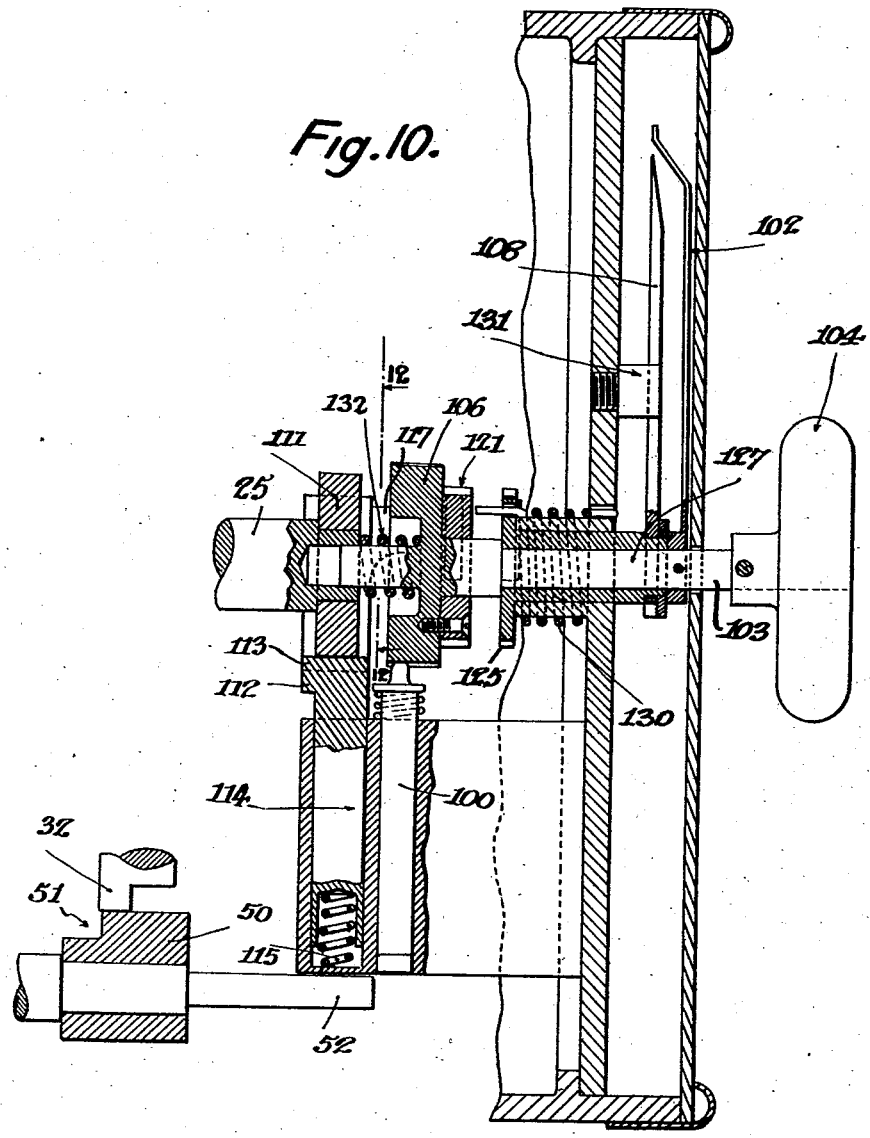

Oct. 4, 1932.   A. E. PANIER   1,881,289
AUTOMATIC LIQUID MEASURING AND DELIVERING APPARATUS
Filed Oct. 21, 1929   6 Sheets-Sheet 6
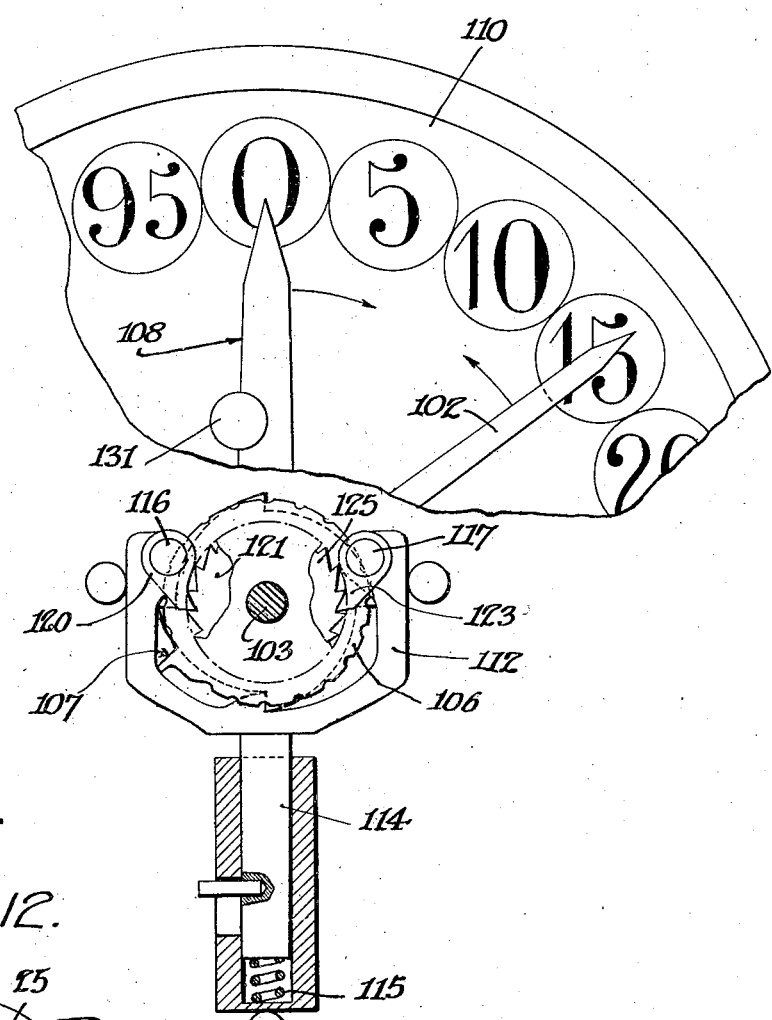
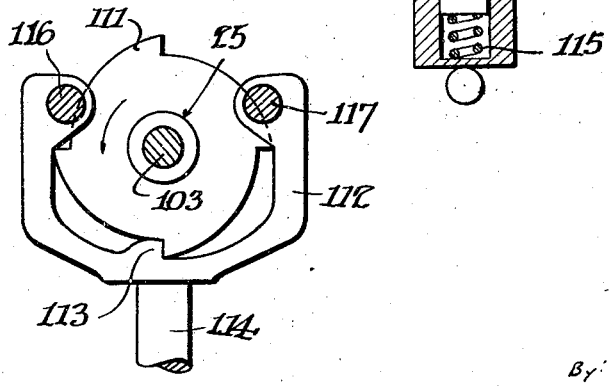

Patented Oct. 4, 1932

1,881,289

UNITED STATES PATENT OFFICE

ANTOINE ERNEST PANIER, OF PARIS, FRANCE, ASSIGNOR TO SOCIETE ANONYME DE MACHINES-OUTILS ET APPAREILS DIVERS "LA SAMOA", OF PARIS, FRANCE

AUTOMATIC LIQUID MEASURING AND DELIVERING APPARATUS

Application filed October 21, 1929, Serial No. 401,185, and in France June 14, 1929.

My invention relates to an apparatus for the delivery of gasoline or other liquids, of the type comprising two measuring vessels whereof one is filled while the other is being emptied, and in which the inversion of the functions of the said vessels is automatically effected by the operation of a rotary cock or like element.

One object of the invention is to provide an apparatus of the aforesaid type in which the rotary cock or like element is operated at proper times by being mechanically coupled to the actuating means for the feeding pump of the apparatus, said coupling action taking place when the pressure of the liquid forced by the pump into the measuring vessel reaches a predetermined value.

Another object of the invention is to provide very simple means whereby the said coupling action is prevented when a predetermined amount of fuel has been delivered.

Further objects of the invention will be disclosed in the following description.

In the accompanying drawings given by way of example:

Fig. 1 is a partial cross-section of the apparatus showing the two measuring vessels and the cock and showing also diagrammatically the feed pump and a part of this mechanical connection between the actuating member of said pump and the cock.

Fig. 2 is a cross-section along the line 2—2 Fig. 5 of the coupling device, between the pump and the cock.

Fig. 3 is a horiozntal section on the line 3—3 of Figure 2.

Fig. 4 is a detail view of some parts shown in Fig. 2.

Fig. 5 is a longitudinal section of the apparatus, the measuring vessels and corresponding parts, located on the left of said figure, being omitted.

Fig. 6 is a partial cross-section along the line 6—6, Fig. 5.

Fig. 7 is a cross-section similar to Fig. 2 and showing a modified construction of the coupling device.

Fig. 8 is a detail sectional view along the line 8—8, Fig. 7.

Fig. 9 is a detail view along the line 9—9, Figure 7.

Fig. 10 is a partial longitudinal section showing a modified construction of the locking means for the coupling device.

Fig. 11 is a front view of same seen from right to left in Figure 10, some parts being broken away.

Figure 12 is a detail view in cross-section along the line 12—12 of Figure 10.

As shown in the drawings, the apparatus comprises two measuring vessels or glass bells 1, 2 mounted on a casing 3 in which a four-way cock 4 is adapted to rotate intermittently through 90°. An admission chamber 5 and a delivery chamber 6 for the fuel are provided in the casing. In the position shown, the measuring vessel 1 is in communication with the admission chamber 5 through the conduit 7 and the cock and the vessel 2 is in communication with the delivery chamber 6 through the conduit 8 and the cock.

The two measuring vessels are provided at their upper ends with retaining valves 9 as usual and are connected to each other by a pipe 10. They are fed by means of any desired type of device. I have shown diagrammatically in Fig. 1 by way of example a tandem pump of a known construction, comprising a fuel pump 11 and an air pump 11$^a$. The fuel pump has a suction pipe 12 and is connected to the admission chamber 5 through a pipe 13. The air pump has a suction pipe 12$^a$ and is connected to pipe 10 by a pipe 13$^a$. The pistons 14, 14$^a$ of the pump, are actuated by means of a rocking lever 15 pivoted at 16.

In accordance with my invention, said rocking lever 15 is also used for positively actuating the rotary cock 4 at the proper times through the medium of a coupling device which will be described later on. As shown in Fig. 1 the rocking lever 15 is provided at its upper end with a toothed sector 15$^a$ in mesh with a pinion 17 which intermittently actuates a shaft 18 by means of a loose wheel device 19. On said shaft 18 is keyed a sprocket wheel 20 which is connected by a chain 21 with a sprocket wheel 22 screwed on a plate 23 (Fig. 5) which is rotatably mounted on the shank 25 of cock 4. Thus, when the lever 15 of the pump is oscillated, the sprocket wheel 22 and plate 23 will be turned by an intermittent movement, and always in the same direction.

The plate 23 which constitutes the driving member of the aforesaid coupling device is provided at the inside with a row of semi-circular recesses 26 (Figs. 3 and 5). The driven element of the coupling is a plate 28 secured on the cock spindle 25 and provided at its periphery with four cam surfaces 29 (Fig. 4). On said plate 28 are formed four radial arm 30 (Fig. 2) in which plungers 31 are adapted to slide, said plungers having a nose 32 at their outer end and being urged outwardly by coil springs 33. Cylindrical studs 34 extending transversally through the plungers are guided in radial slots 36 of the arms 30 and are adapted to engage at one end into the semi-circular recesses 26 of plate 23, when the plungers occupy their outer position.

The plate 28 rotates with the plungers carried thereby within a stationary circular casing 39 (Fig. 2) carrying at one end a horizontal cylinder 40 containing a piston 41 urged by a spring 42. The piston 41 has a nose 44 (Fig. 4) adapted to engage with the cam surfaces 29 on plate 28.

At the lower part of casing 39 is arranged a member 50 (Fig. 2) the upper face of which has an arcuated shape and is provided with a recess 51 (Fig. 5) into which the noses 32 of the pistons 31 can engage. The member 50 is carried by a horizontal rod 52 which is guided axially in a plate 53 of the frame and carries the bottom wall 54 of a flexible casing 55 having a corrugated wall. The member 50 is normally urged towards the plate 53 by a coil spring 56 acting upon bottom 54 of the casing. The inner capacity of the flexible casing 55 is in communication by means of a pipe 57 with the air delivery pipe 13ᵃ of the pump. The flexible casing 55 is located in a chamber 58 (Fig. 5) which is in communication through a small orifice 60 and a conduit, not shown, with the fuel admission chamber 5.

The operation of the mechanism, so far as described, is as follows:

In the position shown in Fig. 2, the nose parts 32 of the upper piston and left hand piston are in contact with the inner surface of casing 39. The nose 32 of the lower piston is in contact with the member 50 and the nose 32 of the right hand piston is in contact with the piston 41. The four radial pistons 31 are thus held in their retracted or inner position. The four studs 34 also occupy their retracted position and their ends adjacent to plate 23 are disengaged from the inner toothing 26 of said plate, as shown in Fig. 3.

In order to deliver fuel, the operating lever 15 is oscillated, whereby the pump is actuated and the plate 23 is rotated.

When one of the measuring vessels 1, 2 has thus been filled and the pump is further operated, the pressure of the fuel in chamber 58 is increased and the bottom wall 54 of the flexible casing 55 is pressed towards the right (Fig. 5) the member 50 is thus moved in the same direction and the nose 32 of the lower piston 31 snaps into the recess 51. At the same time, the corresponding stud 34 engages one of the semi-circular recesses U of plate 23 and plate 28 is caused to rotate with plate 23 in the direction shown by the arrow (Fig. 2), the cock 4 being thus rotated.

When the cock 4 has nearly completed a quarter turn, one of the cam surfaces 29 acts upon the nose 44 (Fig. 4) of piston 41 and moves said piston to the right. When the quarter turn is completed, the nose 44 drops from the cam 29 and the piston 40 is suddenly moved to the left under the action of spring 42. The piston 31 is thus brought to the position shown on the right in Fig. 2 and the stud 34 of the latter is immediately disengaged from the toothing 26.

The cock 4 has thus been turned through 90°. The vessel 1 which was completely filled begins then to deliver fuel and if the pump is further actuated, the other vessel begins to fill up. The plate 23 which is actuated together with the pump, will continue to rotate without carrying along the plate 28 and cock 4 until the vessel 2 will be filled. At that time, the operation above described will be resumed and the cock will turn through a further quarter turn.

Inasmuch as the inside of box 55 is in communication with the air delivered by the pump, all tampering with the apparatus by unduly moving the member 50 to the right in Fig. 5 is prevented.

As explained above, the apparatus can work only if the rod 52 moves to the right in Fig. 5. This affords a very simple way of automatically locking the apparatus when a predetermined amount of fuel has been delivered.

As shown in Fig. 5, in alignment with the cock shank 25 is a shaft 65 carrying a pointer 66 which moves over a dial and is provided at its lower end with a projection or shoulder 67. The shaft 65 which is provided with an operating knob 68 can slide axially in a sleeve 69 in opposition to a spring 70. Said shaft 65 has a head 71 provided with a tooth 72 (Fig. 6) which can engage in a series of recesses provided in the inner surface of a ratchet wheel 74. The latter is intermittently rotated, through the medium of a pawl mechanism of a known type, by a cam 76 (Fig. 5) secured upon the free end of the cock spindle 25.

Said pawl mechanism comprises a rocking lever 77 (Fig. 6) pivoted at 77ª on the frame of the apparatus and actuated by the cam 76. Said lever 77 has a lateral shoulder 77ᵇ engaging between two lugs 78ª on a vertically sliding frame 78 guided on the frame. Upon said slider 78, which is urged upwardly by a spring 78ª, is mounted a spring actuated pawl 79 for rotating the ratchet wheel 74. 79ª denotes a retaining pawl which is mounted on the frame and prevents any undue rotation of said ratchet wheel.

In normal position, the shoulder 67 of the pointer 68 is opposite the end of rod 52 whereby the apparatus is locked. For delivering 15 litres of fuel, for instance, the knob 66 is pulled so as to disengage the tooth 72 from the ratchet wheel 74 and then turned so as to bring the pointer 66 over number 15 on the graduated dial. The knob is then left free and moves to the left under the action of spring 70 so that the tooth 72 comes back into engagement with the ratchet wheel 74.

The pump is then actuated. Inasmuch as the shoulder 67 on the pointer is no more opposite the end of rod 52, the latter is able to move to the right when the bottom wall 54 of casing 55 is moved by the pressure of liquid and the operations above described can take place.

When the cock rotates, the cam 76 on the cock spindle causes the ratchet wheel 74 to turn, through the medium of the pawl mechanism described, and the ratchet wheel 74 causes the shaft 65 to rotate so that the pointer 66 is brought back to the zero position. When the fifteen liters have been delivered, the pointer 66 has come back to its initial position, its projection 67 is again opposite the rod 52 and all further movement of the latter is prevented. The apparatus is thus locked and can be operated again only after the knob 68 has been pulled and turned for a further operation of the apparatus.

Figures 7, 8 and 9 show a modified construction of the mechanism described above for operating the cock. In said modified construction, the operating lever for the pump is used to actuate a shaft 80 (Fig. 7) acting in a manner similar to the plate 23 above described, said shaft being arranged coaxially with the cock spindle 25. On the shaft 80 and cock spindle 25 is rotatably mounted a sleeve 82 provided with an extension 83 and urged by a spring 84 against a stationary abutment piece 85. The sleeve 82 has another extension 86 upon which an arcuated lever 88 is pivoted at 87. The lever 88 has a lug 89 on its outer face and is urged outwardly by a spring 90. At its upper end, the arcuated lever 88 carries a stud 91 and two pawls or clutching fingers 92, 93, guided in the extension 86 are pivoted thereon. Said pawls are bevelled in opposite directions at their inner ends and engage into corresponding notches provided respectively in the spindles 80 and 25.

A rod 95, similar to the rod 52 shown in Fig. 5, is actuated by the bottom wall of an elastic casing operated by the delivery pressure of the fuel as described above. The rod 95 has a recess 96 (Figure 9) in which the arcuated lever 88 is adapted to extend. On the outer casing 98 of the apparatus is a stationary abutment 99, which is adapted to cooperate with the lug 89 on lever 88.

When the pump is actuated and the delivery pressure of the fuel reaches a certain value, the rod 95 is moved axially and the notch 96 comes in front of the arcuated lever 88. The lever will then pivot outwardly and snap into said notch under the action of spring 90, as shown in Figure 7, and the coupling fingers 92, 93 will engage with the teeth on the spindles 80 and 25. The rotation of spindle 80 is thus imparted to the cock spindle 25.

When the cock has turned through the required angle, the lug 89 on lever 88 will engage the abutment 99, the lever 88 will be pushed inwardly, the coupling fingers 92, 93 will be disengaged from the spindles 80 and 25 and the cock will stop. At the same time, the rod 95 is brought back to its original position under the action of the spring 56 (Fig. 5) of the elastic casing.

Figures 10, 11 and 12 show a modification of the locking device shown in Figure 5.

According to said modification, the sliding rod 52 is locked in its initial position and the end of each operation, by a vertical rod 100 (Fig. 10), in the same manner as it was locked by the shoulder 67 of the pointer in the construction shown in Figure 5.

The pointer 102 (Fig. 10) is secured on a shaft 103 carrying the operating knob 104 and a disc 106 having a corrugated periphery and provided with a boss 107 (Fig. 11) adapted to act upon the upper end of the rod 100, so as to hold said rod in a lowered position at the proper time, in order to lock the rod 52 and consequently the operating mechanism for the cock.

In Figs. 10 and 11 I have also shown an additional pointer 108, which moves over the same dial 110 as pointer 102, and is actuated as described below in order to show at the end of each operation the amount of fuel delivered. Upon the end of the shank 25 of the cock is secured a cam 111 having four bosses (Fig. 12), which is adapted to periodically depress a fork 112 by acting on a shoulder 113 of said fork. The shank 113 of the fork is recalled by a spring 115 (Fig. 11).

The fork 112 carries, at its upper end, two horizontal studs 116, 117. On the stud 116 is pivoted a pawl 120 actuating in one direction a ratchet wheel 121 secured on the shaft 103 (Fig. 10). Upon the stud 117 is pivoted a pawl 123 adapted to actuate, in the opposite direction, a ratchet wheel 125 made integral with a bushing 127 freely rotating upon the shaft 103 and carrying the pointer 108. A coil spring 130, in engagement with the ratchet wheel 125 is provided to bring the pointer 108 back to the zero position against an abutment 131. The shaft 103 is guided at one end in the shank 25 of the cock and is urged in the axial direction by a spring 132.

In order to deliver for instance fifteen liters of fuel, the operator pushes the knob 104, whereby the ratchet wheels 121, 125 are disengaged from the pawls 120, 123 respectively and the knob is turned until the pointer 102 is brought over number 15, as shown in Figure 11. The pump is then actuated. As described above, the cock will thus be turned intermittently. During its rotation, the cam 111 (Fig. 12) secured on the cock shank 125 will actuate the fork 112 and the pawl 120 will progressively bring the pointer 102 to zero, while the pawl 123 will progressively bring the pointer 108 to number 15 on the dial.

Of course, the invention is not limited to the modifications shown and described, which have been selected only by way of example. The pump could be actuated by a rotary member instead of being actuated by a rocking lever. The cock could also be arranged so as to rotate at each step by an angle different from 90°. A totalizer is of course provided on the apparatus.

Having now described my invention what I claim as new and desire to secure by Letters Patent is:

1. In a liquid measuring and delivering apparatus, the combination of two measuring vessels, a pump adapted to force a liquid into either of said vessels, a delivery chamber for the liquid, a valve adapted to simultaneously connect either vessel with the pump and the other vessel with the said delivery chamber, a movable member responsive to the pressure of the liquid in the vessel in communication with the pump, and mechanical coupling means cooperating with the said movable member and adapted to operatively connect the pump with the valve.

2. In an apparatus as claimed in claim 1, adjustable locking means for said moving member and means for operatively connecting the said valve with said locking means.

3. In an apparatus as claimed in claim 1, a spring actuated member adapted to bring the coupling means to their inactive position and a member actuated by the valve and adapted to put the spring actuated member under tension.

4. In a liquid measuring and delivering apparatus, the combination of two measuring vessels, a pump adapted to force a liquid into either of said vessels, a delivery chamber for the liquid, a valve adapted to simultaneously connect either vessel with the pump and the other vessel with the said delivery chamber, a driving rotary plate, means for operatively connecting said plate with the pump, a driven plate secured to the valve, spring actuated pistons radially arranged on said driven plate, coupling members on said pistons for engagement with the driving plate, and a movable member responsive to the forced pressure of the liquid and adapted to engage with the said pistons.

5. In a liquid measuring and delivering apparatus as claimed in claim 4, studs carried on the said pistons and adapted to engage in semi-circular recesses provided in the driving plate.

In testimony whereof I have signed my name to this specification.

ANTOINE ERNEST PANIER.